United States Patent
Ganjoo (10) Patent No.: US 10,263,908 B1
(45) Date of Patent: Apr. 16, 2019

(54) PERFORMANCE MANAGEMENT FOR QUERY PROCESSING

(71) Applicant: A9.com, Inc., Palo Alto, CA (US)

(72) Inventor: Afshin Ganjoo, San Jose, CA (US)

(73) Assignee: A9.COM, INC., Palo Alto, CA (US)

(*) Notice: Subject to any disclaimer, the term of this patent is extended or adjusted under 35 U.S.C. 154(b) by 440 days.

(21) Appl. No.: 14/963,800

(22) Filed: Dec. 9, 2015

(51) Int. Cl.
  *G06F 15/173* (2006.01)
  *H04L 12/917* (2013.01)
  *G06F 17/30* (2006.01)
  *H04L 12/26* (2006.01)

(52) U.S. Cl.
  CPC ........ *H04L 47/76* (2013.01); *G06F 17/30321* (2013.01); *G06F 17/30477* (2013.01); *H04L 43/0852* (2013.01); *H04L 43/16* (2013.01)

(58) Field of Classification Search
  None
  See application file for complete search history.

(56) References Cited

U.S. PATENT DOCUMENTS

| | | | |
|---|---|---|---|
| 2009/0192981 A1* | 7/2009 | Papaemmanouil | G06F 17/30516 |
| 2009/0245631 A1* | 10/2009 | Isomura | H04N 19/50 382/166 |
| 2010/0057716 A1* | 3/2010 | Stefik | G06F 17/3071 707/E17.108 |
| 2010/0121865 A1* | 5/2010 | Vaid | G06F 17/30979 707/758 |
| 2010/0299349 A1* | 11/2010 | Greenberg | G06F 17/30902 707/769 |
| 2011/0153592 A1* | 6/2011 | DeMarcken | G06Q 10/02 707/713 |

* cited by examiner

*Primary Examiner* — Mohamed Ibrahim
(74) *Attorney, Agent, or Firm* — Hogan Lovells US, LLP (57) ABSTRACT

The processing of search queries for a customer using a set of resource can balance performance with cost, in order to ensure that the processing satisfies customer performance requirements while attempting to minimize the cost to the customer for obtaining that performance. In addition to dynamically updating the allocation of resources used to process the requests, such as to change the number or sizes of allocated resources, the number of indexes to be searched can be updated as well. For example, a search index can be divided into two sub-indexes against which queries can be executed concurrently in order to reduce the latency by about a half. Adjustments to the indexes and resources can be balanced to minimize cost while retaining performance, which can include rejoining sub-indexes or reducing the number of resource as appropriate.

20 Claims, 9 Drawing Sheets

PERFORMANCE MANAGEMENT FOR QUERY PROCESSING

BACKGROUND

Computing devices are often used to communicate over a network such as the Internet. Network-based services offered by a service provider are becoming more commonplace. Computing devices are frequently used to connect to a network based service, which can provide services such as storing searchable data or providing additional processing power to the computing devices. An increasing number of customers of such a service utilize resources of the service to enable users to search customer-provided data. As the amount of customer data increases and the queries become more complex, the time it takes to execute these queries can increase as well. While additional resources can be used to attempt to reduce the latency, these resources come at an additional cost and the addition of several resources may be too expensive for a customer. This provides difficulty for customers who have specific requirements for the queries of their users, such as a maximum latency.

BRIEF DESCRIPTION OF THE DRAWINGS

Various embodiments in accordance with the present disclosure will be described with reference to the drawings, in which.

DETAILED DESCRIPTION

Approaches in accordance with the various embodiments overcome one or more of the above-mentioned and other deficiencies in existing approaches to managing access to data. In particular, various approaches provide for the dynamic adjustment of components used to process queries on behalf of a customer. In at least some embodiments the allocation of resources used to process the requests can be dynamically updated, such as to change the number or sizes of allocated resources used. In addition, the number of indexes to be searched can be updated as well. For example, a search index can be divided into two or more sub-indexes against which queries can be executed concurrently, in order to reduce the latency by a corresponding amount. Other performance criteria such as queries processed per second can also be used to consider how to balance the number of resources with the number of indexes allocated for the customer. Adjustments to the indexes and resources can be balanced to minimize cost while retaining performance, which can include rejoining sub-indexes or reducing the number of resource as appropriate.

Various other functions and advantages are described and suggested below as may be provided in accordance with the various embodiments.

Figure 1A:
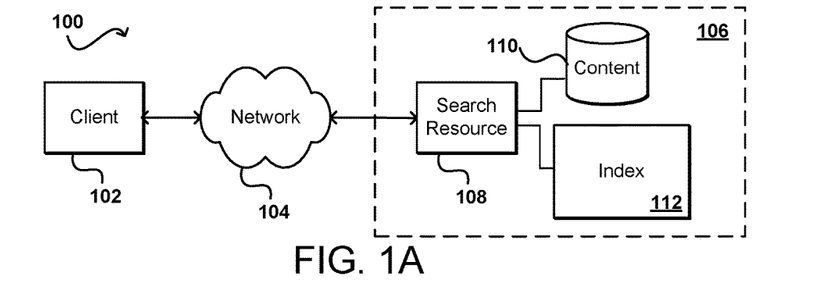
FIGS. 1A, 1B, and 1C illustrate example approaches to managing query latency that can be utilized in accordance with various embodiments.
Figure 1B:
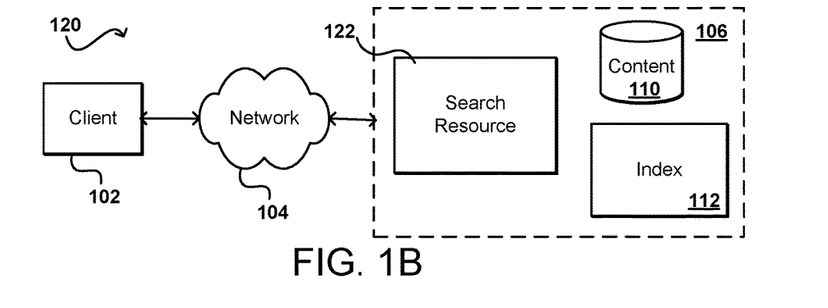
Figure 1C:
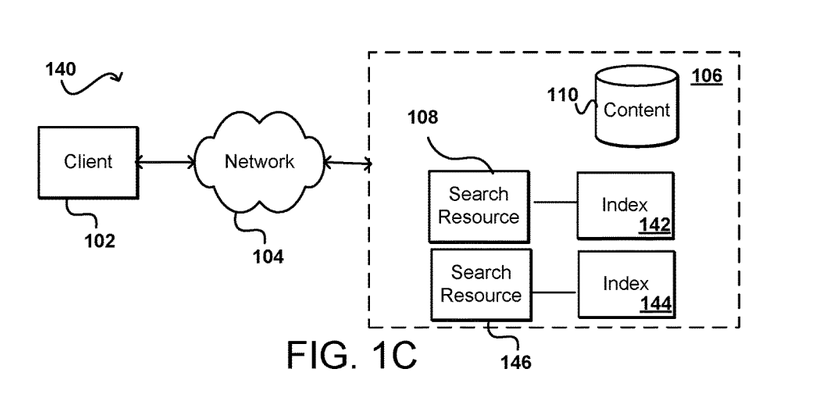

FIGS. 1A through 1C illustrate example approaches that can be used to manage various aspects (i.e., the latency of search queries or number of queries processed per second) for processing search queries in accordance with various embodiments. In the example 100 of FIG. 1A, a client device 102 is able to submit a search query across at least one network 104 (e.g., the Internet, an intranet, a cellular network, a local area network, etc.) to be delivered to a resource environment 106, as may be used to provide a data search service among other such offerings. At least one resource 108, such as a search server configured with appropriate search instructions, can compare keywords or other portions of the query against entries in an index 112, where that index relates to data and/or content stored in at least one content repository 110 or other such data store. The index can be generated for the data and/or content using any appropriate indexing approach known or used for such purposes. The search result can perform tasks such as to locate matches for the keywords from the index, determine relevance scores for the matches, and select a portion of the matches as search results based at least in part upon the respective relevancy scores. The search results can include, or at least point to, corresponding content stored in the content repository 110.

In some embodiments, the data that is searched using the query is stored for a customer of the resource provider network, typically having an account with the resource provider whereby the customer pays for usage of the resources. Users associated with the customer can submit queries against the customer data, and the customer will be charged for the service. There can be many ways in which to charge the customer, but the amount will generally reflect the number and/or type of resources needed, as well as the amount or capacity of those resources, as may include storage space, network bandwidth, and the like. Customers often will want to obtain the resources needed to provide this service to the users, but will only want to spend up to a certain amount of money over a given period of time. Customers also may want to ensure that the experience of those users satisfies one or more customer criteria. Among these criteria is often the latency experienced for a search request. For example, a customer might want to ensure that the latency for user searches is less than one hundred milliseconds, for at least 95% of the user queries submitted. It is understood that some complex queries will take extra time to process, so it is often the case that up to 5% of the most unusually complex queries will not be considered in the overall latency performance determination.

Query latency can increase for several reasons, including an increase in the number of documents in the index, increase in the attributes stored in each document, increase in the number of queries sent, and increase in the complexity of the queries sent. Increase in latency can be a natural progression of the client's search domain, but also can be a result of a sudden change in client's search behavior. The common way to keep query latency in check is to migrate the client search domain onto a faster, larger resource instance. This approach can be limited by the ultimate speed and capabilities of the fastest, largest instance. It also does not provide enough granularity to achieve the lowest cost possible for the customer while keeping their latency in check.

One way to reduce latency for search queries is to increase the capacity of the resource(s) used to process the queries. As illustrated in the example 120 of FIG. 1B, a larger search resource 122 can be allocated in order to, for example, double the processing capacity for received search queries that are associated with a particular customer account. This "larger" resource can have additional capacity such as additional CPU, memory, bandwidth, or storage capacity, among others. In some embodiment additional resources can be provided to obtain a similar increase in capacity. In some embodiments, the approach can involve providing a combination of resources of potentially different types, sizes, numbers, and capacities in order to satisfy the latency requirement of a customer.

As mentioned, however, the additional resource capacity will generally come at a higher cost to the customer, and the customer may not be willing to pay the amount needed to satisfy the latency requirement with this particular provider. That may result in the customer going elsewhere, having to spend more money than desired, or allowing the users to obtain a lower quality user experience than desired. In one example, the pricing for a customer can vary based at least in part upon the size or capacity of a resource allocated. For example, a customer might utilize a large resource instance at $0.853 per hour. It is possible that the index and/or query complexity grows such that the latency for the customer is doubled. The customer can have various options. For example, the customer can go to a resource instance with twice the capacity at $1.705/hour, but the use of a larger resource instance will not reduce the latency. The use of a larger instance only allows a larger index to be accommodated, it case the index had outgrown the smaller instance. Alternatively, the customer can go to a pair of instances of similar size to the first instance, at a total of $1.706/hour, divide the index to two sub-indexes with each sub-index on its own instance, and cut the latency by almost half (with a small overhead due to merging the results). In at least some embodiments the second option would be preferable, particularly since the same increase in memory and/or storage can be obtained for approximately the same cost, but the latency is cut in half due to the parallelism in running the two sub-indexes. If the pricing difference was not equal to computing power difference, the result might change accordingly. In such instances, it may be desirable to move to a single larger resource instance if the cost is less, as long has latency has not surpassed the agreed SLA, in order to save customer some money.

Further, in at least some embodiments the larger resource will result in an increase in latency, as the index is processed sequentially such that an increase in the processing of search requests can actually result in an increase in the latency for processing each of those requests against the same index.

Accordingly, approaches in accordance with various embodiments can, instead of or in addition to modifying the types of resources utilized, adjust the size and number of indexes used for the customer data. As an example, FIG. 1C illustrates a situation 140 where the customer index has been divided into two indexes, or sub-indexes 142, 144, each of approximately the same size, which is about half the size of the original index 112. It should be understood, however, that in other embodiments the sub-indexes can be of substantially different sizes, and that an index can be divided up into varying numbers of sub-indexes as well. When an index is divided in half, the amount of time needed to execute a search query against that index similarly is approximately halved. Each sub-index can have an associated search resource 108, 146 for utilizing the respective sub-index, where those search resources can be similar in size and type to the search resource 108 illustrated in FIG. 1A, for example. By managing the number of sub-indexes provided the latency for search queries can be reduced without a significant increase in resource cost as would be accrued by simply utilizing more resource capacity. It should be understood that there will be some additional resource usage for purposes of splitting (or merging) indexes, as well as merging results obtained from multiple search indexes, but that this usage will be much less expensive in many cases than allocating the additional resource capacity to obtain a similar reduction in query latency.

In some embodiments, the customer will want the resource provider environment, or search service provided by that environment, to generate the search index 112 for the customer data. Conventional approaches typically require the customer to first select a configuration (i.e., index configuration, schema, index setting, etc.) for the data to be indexed, or conventional approaches can require a configuration/format (e.g., Search Data Format (SDF)) with which the data must comply. In some embodiments, the customer can transmit the data to the network service, and the network service can automatically (i.e., without an instruction or a request from the customer) analyze the data and generate an index configuration (e.g., search index configuration, search index schema, etc.) for the data. For example, in some embodiments, the network service can analyze the data by determining a type of data field for one or more data fields included in the data and determining a search option to be enabled for one or more data fields included in the data.

With regard to determining the type of data field, there can be a plurality of data field types that the data (e.g., document, file, etc.) can be associated with, such as an integer type of data field, a literal type of data field, or a text type of data field, and so forth. In some embodiments, the data can include a plurality of data fields, each data field including a value (e.g., data field "name" can have a value of "ABCD-Brand Shirt"; data field "Price" can have a value of "$20'; etc.). The network service can analyze the plurality of data fields included in the data 110 to determine a data field type for each data field in the plurality.

For example, for each data field, the network search service can determine whether the value of each respective data field comprises an amount of integers above a specified integer amount threshold (e.g., value of data field "Price" is all integers); if so, then that respective data field can be determined to be of an integer data field type. The network service can also determine whether a data field is of a literal data field type by, for example, determining at least one of a value associated with the data field having an amount of alphabetic characters above a specified lower literal amount threshold but below a specified upper literal amount threshold, a number of distinct values associated with the data field being below a specified literal distinct amount threshold, a percentage of distinct values being below a specified literal distinct percentage threshold, or a length of values being below a specified literal length threshold. In some embodiments, the network service can, for example, consider the length of a data field value and the frequency and/or percentage of distinct values in the data field value to identify the data field as being of a text type; if there are many distinct values in a data field value and the data field value is very long (e.g., has a number of alphanumeric characters above a threshold), then the data field is likely of a text type. In some embodiments, if a data field is not of an integer type or a literal type, then the data field can be of a text type.

Regarding determining the search option, the network service can determine one or more search options to be enabled for (the data fields of) the data. For example, having determined a data field type for a data field included in the data, the network service can determine whether or not to enable an option to include the data field in the search index to be generated, whether or not to enable an option to calculate a facet count for the data field, and/or whether or not to enable an option to return/provide a search value for the data type.

Turning now to the generating of a configuration for the data, the network service can automatically (i.e., without an instruction from the customer) generate a configuration (e.g., search index configuration, schema, etc.) for the data. In some embodiments, the configuration can, at least in part, help determine how to index the data; the index configuration can, at least in part, govern how the data will be indexed. The configuration or schema can specify a data field type for each data field included in the data, indicate whether each data field is searchable, indicate whether each data field is rankable (e.g., sortable), and other similar information useful for building the index. Subsequent to generating the configuration for the data to be indexed, the network service can generate a search index for the data based in at least part on the generated configuration.

Figure 2:
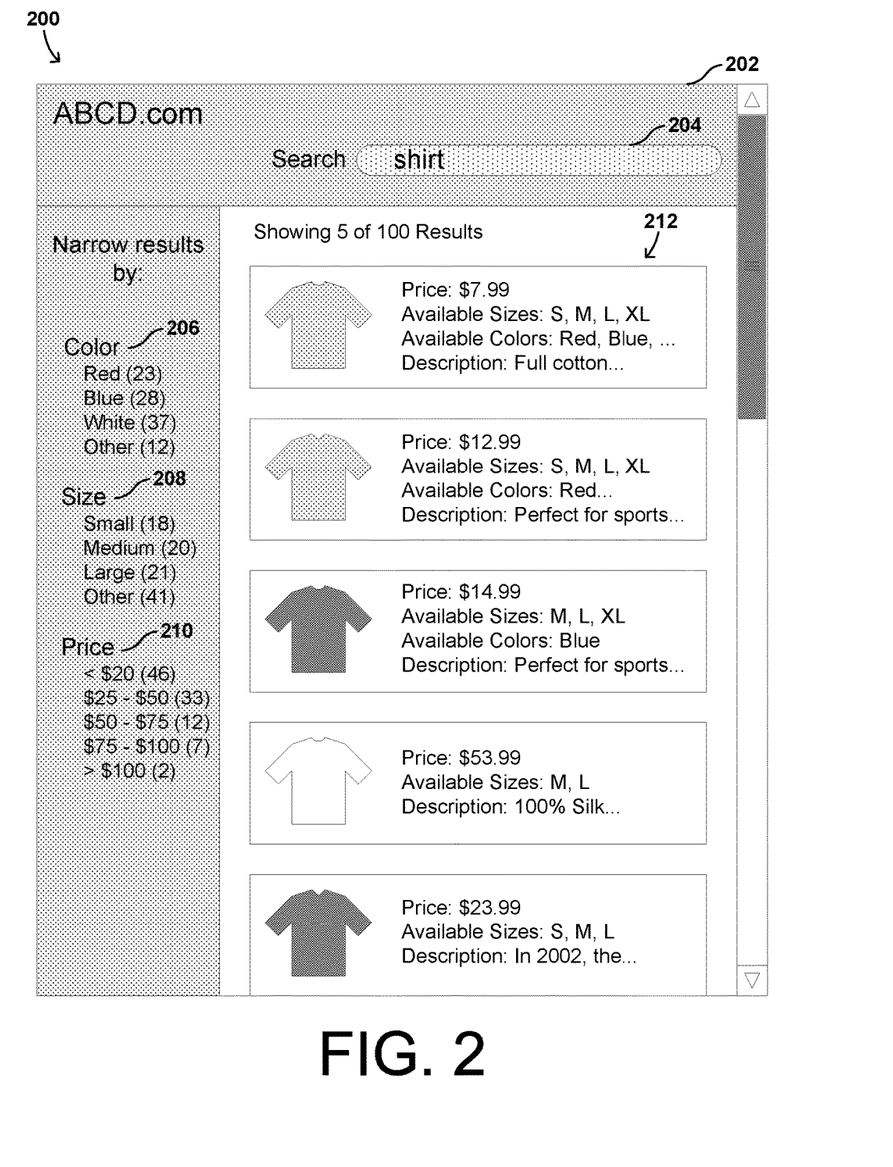
FIG. 2 illustrates an example display of search results that can be provided in accordance with various embodiments.

FIG. 2 illustrates an example web browsing environment 200 in which an index configuration for searchable data in a networked environment can be utilized. The example web browsing environment 200 can comprise an example web page 202 being rendered by an application, such as a web browser. In this example, the web page 202 can be provided by a network service that is associated with the domain, ABCD.com.

A user/entity (e.g., customer of the network service) can be a retailer and can upload data that is related to selling shirts, for example. The data can be indexed and stored by the network service and made searchable to others such as potential customers of the user/entity. The network service can analyze the data to determine a type of data field (i.e., data field type) for each of the data fields included in the data. For example, the data related to the selling of shirts can include data fields such as "Color" 206, "Size" 208, "Price" 210, "Description," and other fields. The network service can analyze the value for each data field to determine a type for each respective data field. The network service can also determine one or more options (e.g., search options) to enable for each data field. The network service can subsequently generate a configuration/schema for the data to be indexed. Then the network service can generate an index for the data based on the configuration/schema.

For example, the network service can identify the data field "Color" and determine that its value (e.g., "Red," "Blue," "White," "Green," etc.) is alphabetic/literal and may identity the type of the "Color" data field to be a literal type. (In this example, the data associated with the "Color" data field and the values (e.g., "Red," "Blue," "White," "Green," etc.) can be uploaded by the entity.) In another example, the network service can identify a "Size" data field in at least a portion of the uploaded data and determine that the values contained in the "Size" data field are numeric values. In this instance, the network service may determine that the "Size" data field is an integer type. In a further example, the network service can identify the values for the "Description" data fields in at least a portion of the uploaded data and may determine that the values include both numbers and alphabetic characters, and/or that the values are lengthy in terms of the number of characters, and/or that the values have distinct terms/phrases/symbols. In this instance, the network service may determine that the "Description" data field is a text type.

Regarding the search options, the network service can determine, for each of the data fields, whether to not to enable the option to include a respective data field in the search index to be generated. For example, in some embodiments, the "Description" data fields (and corresponding values) can be omitted from the search index. If so, then when a query is run with respect the search index, the query will not search the "Description" data field. However, some embodiments can and do include the "Description" data fields and values in the search index.

Moreover, the network service can determine whether or not to enable the option to calculate a facet count for each data field. As mentioned above, a facet count represents how many of the results matching a search query have a particular value (or range of values) for a particular data field. For example, as shown in FIG. 2, the "Color" data field with a value of "Red" has a facet count of 23 (i.e., 23 search results for a "Red" shirt), whereas the "Blue" value of the "Color" data field has a facet count of 28 (i.e., 28 search results for a "Blue" shirt), and so forth. In some embodiments, the values can overlap (i.e., do not have to be an exact match). For example, a shirt with blue and red stripes can be associated with both the "Blue" and "Red" values, and/or with other values. In some embodiments, the network service can determine that facet counts should be calculated for some of the data fields, but not necessarily all of the data fields. For example, the network service can determine that there should be facet counts for "Color," "Size," and "Price," but not for "Description."

Furthermore, the network service can determine whether or not to enable a return of the value for a data field. For example, there can be a data field "Internal Product Identification Number" included in the data, the value of the data field being a product identification number internal to the entity and not intended to be shown to a customer of the entity; as such, the network service can determine not to enable a return of the value for such a data field.

It is contemplated that there can be additional options as well as data related to other items that a person having ordinary skill in the art would recognize. For example, the network service can determine whether or not to enable an option to make a data field rankable (e.g., sortable). With reference to FIG. 2, in some embodiments, the "Price" data field can be ranked/sorted by its values (e.g., from lowest price to highest price, from highest price to lowest price, etc.), the "Color" data field can be sorted alphabetically (not illustrated in FIG. 2), and so forth. In another example (not illustrated), there can be data related to media files, such as music, videos, books, photographs, etc. Example data fields for the media files can include, but are not limited to, "Title," "Artist/Author," "Year Created," "Price," "Rating," etc.

Having determined the types of the data fields included in the data and the one or more search options for the data fields included in the data, the network service can generate a configuration (i.e., search index configuration, schema, etc.)

for the data, the generating of the configuration being based at least in part on the determined data field types and search options.

Subsequent to generating the configuration, the network service can generate a search index for the data based at least in part on the generated configuration. Accordingly, the data provided by the entity can be stored with the network service and the search index for the data generated by the network service.

Figure 3:
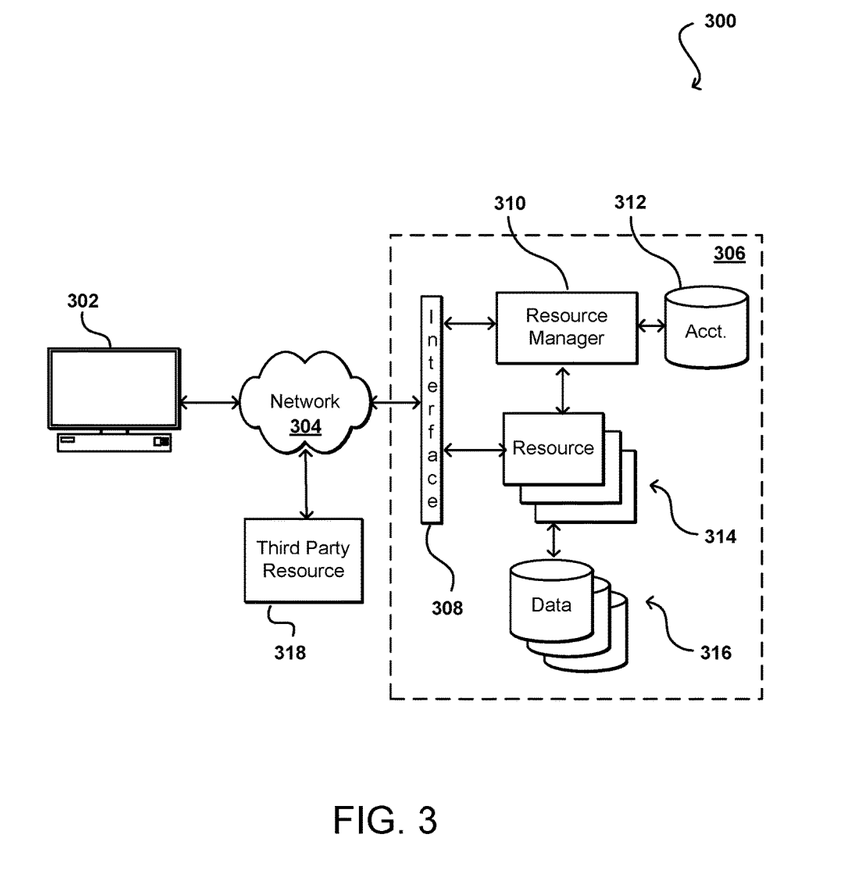
FIG. 3 illustrates an example resource environment that can be used to perform search queries in accordance with various embodiments.

FIG. 3 illustrates an example environment 300 in which aspects of the various embodiments can be implemented. In this example a user is able to utilize a client device 302 to submit search requests across at least one network 304 to a resource provider environment 306 as discussed previously. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

Figure 4:
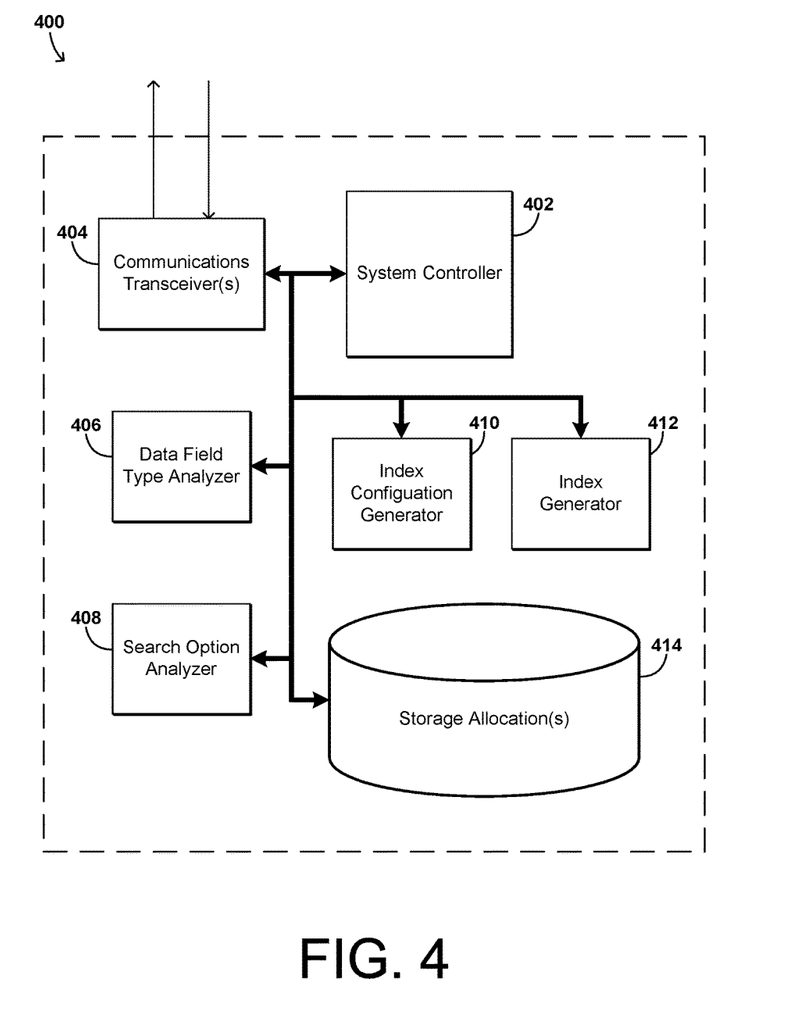
FIG. 4 illustrates components of an example data storage and retrieval service that can be utilized in accordance with various embodiments.

FIG. 4 illustrates an example system embodiment 400 for an index configuration for searchable data in a networked environment. The example system embodiment 400 can comprise a system controller 402, at least one communication transceiver 404, a data field type analyzer 406, a search option analyzer 408, an index configuration generator 410, an index generator 412, and at least one storage allocation 414.

The system controller 402 can facilitate the system to perform various operations for index configuration for searchable data in a networked environment. The system controller 402 can communicate with the at least one communications transceiver 404 to facilitate data transmission to and/or data receipt from one or more sources external to the system 400 as well as to facilitate data communication among the system.

Data received (e.g., from an entity) by the system 400 via the communications transceiver 404 can be analyzed by the data field type analyzer 406 to determine a type associated with each of the data fields included in the data. The data can also be analyzed by the search option analyzer 408 to determine whether or not to enable one or more search options with respect to each of the data fields included in the data. Based at least in part on the determined data field types and the one or more determined search options, the index configuration generator 410 can generate a search index configuration/schema. Then based at least in part on the generated search index configuration/schema, the index generator 412 can generate a search index for the data. The data and the search index generated for the data can be stored on one or more storage allocations 414.

It is contemplated that the various components and/or portions of the example system 400 can be implemented as hardware, software, or a combination of both. For example, the various parts of the system 400 can be implemented via a circuit, a processor, an application, a portion of programming code, an algorithm, or any combination thereof, etc. It is also contemplated FIG. 4 is an example and meant to be used for illustrative purposes only. For example, the various components do not have to be configured according to FIG. 4. In some embodiments, the various components do not have to be tightly coupled to one another and can instead be spread across a more distributed system. For example, a component such as the index generator can reside on a separate/different network and/or system, but still retain a communicative connection(s) to the other components.

Figure 5:
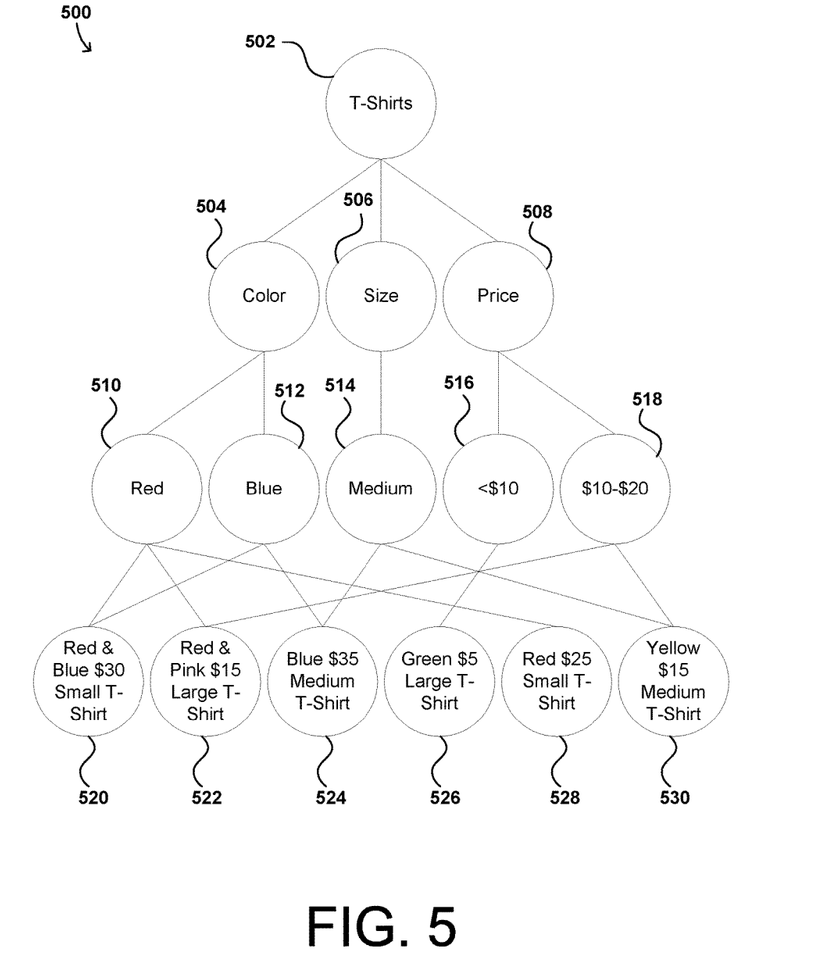
FIG. 5 illustrates an example index for a customer data set that can be utilized in accordance with various embodiments.

FIG. 5 illustrates an example search index 500 that can be generated in accordance with the various embodiments of the present disclosure. With reference to FIG. 5, there can be a root node 502 in the search index. In the example of FIG. 5, data can be uploaded by an entity such as a T-Shirt retailer. The data can correspond to information about the T-Shirts (root node 502) that the entity has made available for sale. There can be parent nodes (e.g., 504, 506, 508) that represent data fields for the data relating to the T-Shirts. For example, the T-Shirts can have a Color data field 504, a Size data field 506, and a Price data field 508.

Continuing with the example of FIG. 5, the data fields can have child nodes (e.g., 510, 512, 514, 516, 518) that represent values within each respective data field. For example, there can be at least two Colors (Red 510 and Blue 512), one Size (Medium 514), and two Price ranges (<$10 516 and $10-$20 518). There can also be a set of search results/items (e.g., T-Shirts 520, 522, 524, 526, 528, 530) that can correspond to one or more of the data fields and values.

In this example, all three data fields (Color 504, Size 506, and Price 508) are to be included in the search index, can have facet counts, and can provide/return values in response to relevant search queries. For example, as shown in FIG. 5, Color:Red 510 can have a facet count of three and Color: Blue 512 can have a facet count of two. Size:Medium 514 can have a facet count of two. Price:<$10 516 can have a facet count of one and Price:$10-$20 518 can have a facet count of two. Moreover, a search query of Color:Red 510, for example, will return T-Shirts 522, 524, and 528; searching for Red 510 and Blue 512, for example, will return T-Shirt 522; and so forth. Although the example search index 500 is shown as a being a tree structure, it is contemplated that the search index can be generated in many other ways and/or with other structures.

As mentioned, the amount of time needed to execute a particular query against a search index depends in part upon the complexity of the query, and in part upon the size of the search index. Accordingly, one way to manage aspects such as query latency is to adjust the size of the indexes against which the queries are executed. FIGS. 6A through 6D illustrate one example approach to managing latency through index manipulation that can be utilized in accordance with various embodiments. In the example situation 600 of FIG. 6A, a single index 602 is generated for a set of customer data using any of a number of different approaches as discussed and suggested elsewhere herein. The latency of a set of queries executed against the index can be determined, such as by using a query manager or other monitoring component, and determining at least one value of the latency, such as an average value, the highest latency value for the queries with the lowest 95% of latency values, maximum latency for queries satisfying one or more specified criteria, and the like.

In this example, it is determined that the latency values are too high, or that the latency experienced by at least some users is too long. Accordingly, the index can be split into a pair of sub-indexes 622, 624 as illustrated in the example situation 620 of FIG. 6B. In this example, the index was split nearly in half, resulting in two sub-indexes of approximately the same size. As mentioned, the index 602 could have been split into a different number of sub-indexes and/or the sub-indexes could have been of different sizes, among other such options. The latency can be re-evaluated, and if the still does not satisfy the latency criterion, or at some point no longer satisfies the criterion, the index can be split again, such as into four sub-indexes 642, 644, 646, 648 as illustrated in the example situation 640 of FIG. 6C. In this example, the index is split into four sub-indexes of approximately the same size, which are each approximately one-fourth of the size of the original index 602. It should be understood that the size of the indexes and sub-indexes can change over time, such that four sub-indexes might not actually each be approximately one-fourth of the size of the original single index, but for simplicity of explanation the changing of size of the index as additional data is indexed, for example, is left out of the illustrations.

Figure 6A:
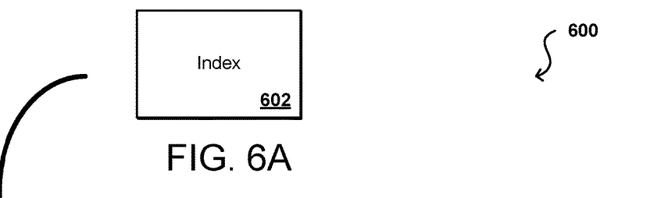
FIGS. 6A, 6B, 6C and 6D illustrate changes that can be made to an example index to manage query latency in accordance with various embodiments.
Figure 6B:
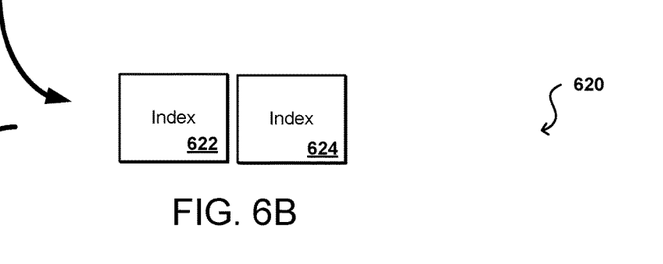
Figure 6C:
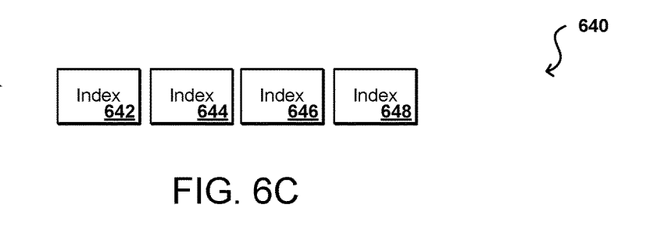
Figure 6D:
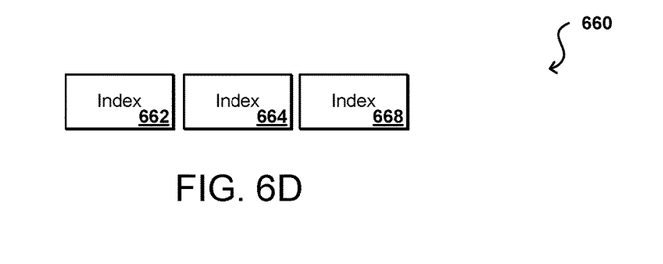

As mentioned, the smaller indexes result in lower latency because the query can be executed against each sub-index in parallel, or at least concurrently, such that the amount of time needed can be inversely proportional to the number of sub-indexes into which the customer index is divided. As mentioned, there will be some amount of time to aggregate the results and select result to provide in response to the query, but for large indexes this time will be a very small fraction of the time needed to execute the search against a single, large index.

While breaking the indexes into sub-indexes can help to reduce latency, there can also be some advantages to minimizing the number of sub-indexes utilized. For example, each sub-index requires a respective resource to execute the query against the index. While a hundred small sub-indexes might make the process very fast, the dedication of one hundred resources to the task (with the associated costs), along with the management and updating overhead, may make such an approach undesirable as well. Thus, it can be desirable to not only split the index into sub-indexes when needed for latency, but also to combine the sub-indexes as appropriate to minimize the overhead and additional resources, or resource instances, needed. As illustrated in the example 660 of FIG. 6D, the sub-indexes can be combined into two or three sub-indexes 662, 664, 668 in order to reduce the resources and overhead needed to manage and utilize the various sub-indexes. As mentioned, the number and sizes of resources allocated can be adjusted as well in order to attempt to keep the latency within the desired tolerance while minimizing cost to the customer and/or the resource provider.

Figure 7:
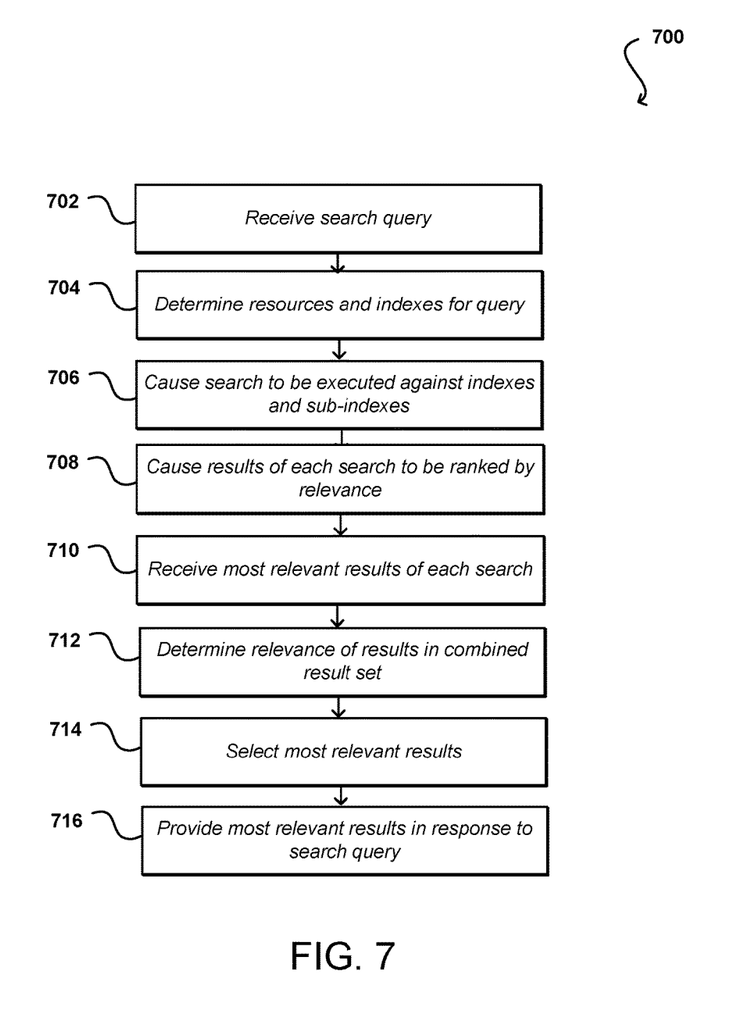
FIG. 7 illustrates an example process for providing search results that can be utilized in accordance with various embodiments.

FIG. 7 illustrates an example process 700 for locating search results that can be utilized in accordance with various embodiments. It should be understood that, for any process described herein, that there can be additional, alternative, or fewer steps performed in similar or alternative orders, or concurrently, within the scope of the various embodiments unless otherwise specifically stated. In this example, a search query is received 702 that in this example is associated with a customer account. It should be understood, however, that in some embodiments the provider might be the customer, or the data that is indexed might be data of the provider, among other such options. Further, the search query can be received from an entity associated with the customer or the provider, or a user having authorized access under an account or relationship with the customer or provider, among other such options.

The query can be analyzed and an associated customer allocation or customer account determined, for example, such that the appropriate resources (or resource instances such as virtual machines) and indexes can be determined 704 or otherwise identified. This can include, for example, determining the various sub-indexes to be searched and available resources for performing those searches. The search can then be caused 706 to be executed against the various identified indexes. In some embodiments there may be multiple indexes, and only one or more of those indexes might be divided into sub-indexes. The search also might not include all indexes. The process in some embodiments can include a search manager or other such component or service sending instructions and a copy of the query to each identified resource, such as each virtual machine instance, for purposes of executing the query against a respective index, or sub-index. The result of each search can be ranked 708 by relevance using any appropriate match and/or ranking algorithm known or used for such purposes, or discussed elsewhere herein, and at least the most relevant results from each search (i.e., a determined number of results with the highest relevance score or ranking) can be received 710 to the search manager component or another system or service configured to aggregate the results from the various searches into a single set of ranked search results. The appropriate system, service, or component can then determine 712 the respective relevance of the results in the combined set, which can include a straight comparison using the scores from the respective searches or a weighted or adjusted score based on the performance of the respective resource, among other such options. The most relevant results can be selected 714 from the combined set, such as by selecting an appropriate number of the results with the highest relevance scores. As known for determining search results, however, there can be other criteria for including, excluding, or re-ranking certain results that can be used to affect the selection in at least some embodiments. Once the most relevant results are selected from the combined set, those results can be provided 716 in response to the query, such as may be displayed on a screen of a computing device. As mentioned, each search result in some embodiments can include a pointer, link, or other element enabling additional related content to be obtained for each link. In some embodiments, each search against a sub-index can return a number of results, such as twenty top results, which are to be aggregated and analyzed to select the top twenty results from the combined set to return to a source of the initial query. Different numbers or variations can be used as well within the scope of the various embodiments.

Figure 8:
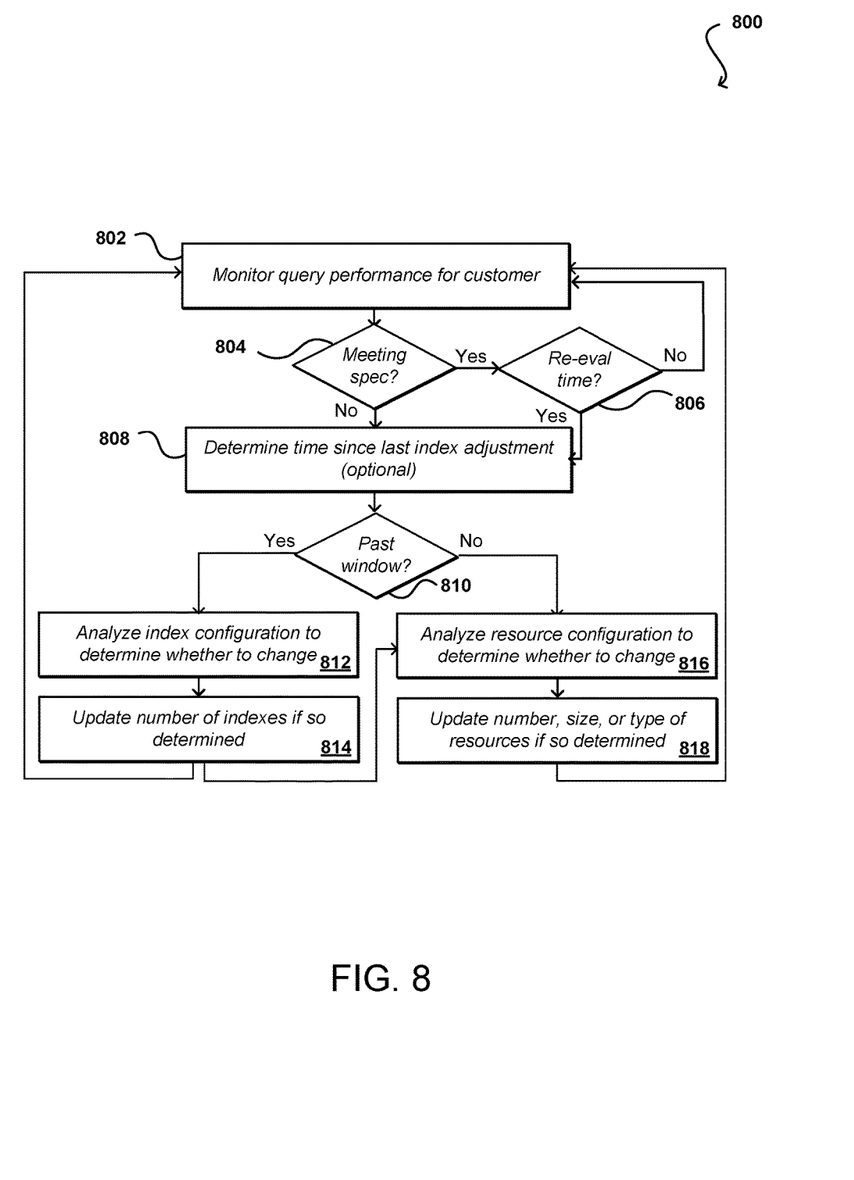
FIG. 8 illustrates an example process for modifying the resources and/or indexes used for a customer deployment that can be utilized in accordance with various embodiments.

As mentioned, the types, number, and sizes of resources and/or indexes used for a data set can be adjusted over time based upon factors such as latency and resource cost, among other such options. FIG. 8 illustrates one example process 800 for managing the resources and indexes that can be used in accordance with various embodiments. In this example, the query performance for a customer is monitored 802 over time. This can include, for example, recording the determined latency for each request associated with a customer over a period of time, then determining a metric by which to judge the performance. The metric can depend at least in part upon the criterion or threshold specified by the customer. For example, the customer might specify an average latency value or might specify a maximum latency value, such as a maximum latency value of no more than 100 milliseconds for a certain percentage of received queries, where that percentage is less than 100% to prevent outliers with extremely long processing times from skewing the results.

As part of the monitoring, a determination can be made 804 at the appropriate times as to whether the determined latency is meeting or satisfying the threshold or criterion specified by the customer (or other authorized entity). This determination can be made continually, periodically, in response to customer requests, or at other appropriate times that can be determined manually or automatically. If the current configuration is satisfying the criterion, for example, the configuration can be left alone and the monitoring can continue. As mentioned herein, however, it can be desirable in at least some situations to periodically re-evaluate the configuration even if the configuration is providing adequate performance. For example, the latency values might be acceptable but it might be possible to satisfy the latency criterion using fewer resources or sub-indexes. Accordingly, at appropriate times or intervals a re-evaluation can be triggered 806 even if the performance of the current configuration is performing adequately, in order to conserve resources and customer cost, among other such reasons.

If an evaluation is to be performed, either as a result of a period check, a latency value outside the specified range or value, or a latency value predicted to fall, or at risk of falling, outside the specified range or value, an amount of time since the last index adjustment can optionally be determined 808 in some embodiments. As mentioned elsewhere herein, there is some amount of overhead occurred in dividing and/or merging indexes, and the process may increase latency for pending search queries, such that it may be desirable to only adjust the number of indexes at certain intervals, such as no more than once a day or once a week, although shorter or longer times can be used as well as may depend upon factors such as the type of deployment, amount of data indexed, etc. In other embodiments, however, attempts can be made to optimize the system regardless of the time since the last optimization as mentioned elsewhere herein.

If a sufficient amount of time has passed since the last index adjustment, or it is determined that the deployment is past the appropriate time window, then the index configuration can be re-examined. In this example, the index configuration can be analyzed 812 to determine whether or not to make a change. This can include, for example, comparing the current latency value against the latency threshold, for example, to determine an amount that the current value is over, or under, the threshold. The effect of adding or removing a sub-index can be determined and compared against this value. For example, if the threshold is 100 milliseconds and latency is currently at 30 milliseconds for two sub-indexes, then merging the indexes into a single index should result in a latency of around 60 milliseconds, which would still be under the latency threshold. Similarly, if there are three sub-indexes with a latency value of 160 milliseconds for a 100 millisecond threshold, then doubling the number of sub-indexes to six should bring the latency value down to around 80 milliseconds. Going to five sub-indexes instead, however, should bring the latency value down to just under the threshold. Other factors can be considered to determine which number of sub-indexes to use. For example, if the latency value has been rapidly increasing over time and the trend is expected (or predicted) to continue, such that the latency value is predicted to fall outside of range over the next time window if only going to five sub-indexes, then a decision to go to six sub-indexes might be made. Alternatively, if going to six sub-indexes would require an additional instance that would go over the customer budget, then maybe a combination of five sub-indexes with a swap out to one larger instance might be the determination. In some approaches the smaller change might always be implemented first in order to determine the effect, then a larger change can be made later, among other such options. If a change is to be made, then the number of indexes can be updated 814 by splitting and/or joining indexes as discussed and suggested herein.

As part of the index analysis and/or if time for index analysis has not yet arrived, an analysis of the resources allocated to processing search requests for the customer can be re-evaluated. As with the indexes, the current resource allocation, deployment, and/or configuration can be analyzed 816 to attempt to determine whether to change the resource configuration, etc. This can include, for example, comparing the current latency value against a latency threshold and determining the effect that a change in the number, type, and/or size of resources allocated would bring the latency closer to the threshold while remaining under (or getting under) the threshold, in order to satisfy customer latency requirements while minimizing customer cost. If a change is to be made, then the number, type, and/or size of resources allocated can be updated 818 by splitting and/or joining indexes as discussed and suggested herein.

Figure 9:
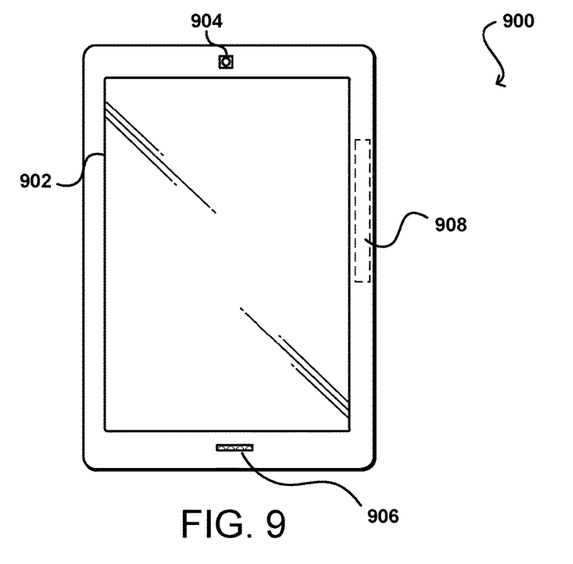
FIG. 9 illustrates an example device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device 900 can be an analog device, such as a device that can perform signal processing using operational amplifiers. In this example, the computing device 900 has a display screen 902 on the front side, which under normal operation will display information to a user facing the display screen (e.g., on the same side of the computing device as the display screen). The computing device in this example includes at least one camera 904 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 900 also includes at least one microphone 906 or other audio capture device capable of capturing audio data, such as words or commands spoken by a user of the device. In this example, a microphone 906 is placed on the same side of the device as the display screen 902, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 900 also includes at least one orientation sensor 908, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 10:
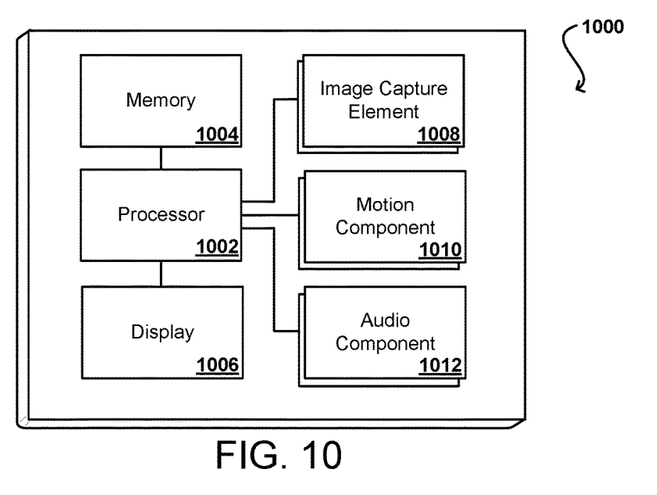
FIG. 10 illustrates example components of a client device such as that illustrated in FIG. 9.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1012, such as a mono or stereo microphone or microphone array, operable to capture audio information from at least one primary direction. A microphone can be a uni- or omni-directional microphone as known for such devices.

In some embodiments, the computing device 1000 of FIG. 10 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1000 also can include at least one orientation or motion sensor 1010. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1002, whereby the device can perform any of a number of actions described or suggested herein.

As an example, a computing device such as that described with respect to FIG. 9 can capture and/or track various types of information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer-readable media for containing code, or portions of code, can include any appropriate non-transitory media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a latency value, based on at least one of an average latency or a maximum latency, for processing of search queries against an index of stored data using an allocation of resources;
    determining that the latency does not satisfy a latency criterion for the processing;
    determining a latency impact of splitting the data index into two or more sub-indexes;
    splitting the index into a number of sub-indexes based at least in part upon the latency impact and an amount of latency reduction needed to cause the latency value to satisfy the latency criterion; and
    processing the search queries against the number of sub-indexes.

2. The computer-implemented method of claim 1, further comprising:
    determining an additional latency impact of modifying the allocation of resources for processing search queries against the stored data; and
    modifying the allocation of resources based at least in part upon the additional latency impact and the amount of latency reduction needed to cause the latency value to satisfy the latency criterion.

3. The computer-implemented method of claim 2, further comprising:
    determining an amount by which to split the index and a way in which to modify the allocation based at least in part upon a resulting cost to an entity associated with the stored data.

4. The computer-implemented method of claim 3, further comprising:
    calculating a predicted latency for subsequent requests processed over a future period of time; and
    modifying at least one of the allocation of resources or the number of indexes and sub-indexes based at least in part upon the predicted latency.

5. The computer-implemented method of claim 1, further comprising:
    periodically re-evaluating a cost of query processing with respect to the latency value in order to attempt to minimize the cost while maintaining satisfaction of the latency criterion.

6. The computer-implemented method of claim 5, further comprising:
    determining a number of queries processed per second; and
    further re-evaluating an effect on the number of queries processed per second in order to attempt to minimize the cost while maintaining satisfaction of the latency criterion and maintaining a minimum number of queries processed per second.

7. The computer-implemented method of claim 5, wherein the resources include at least one of computing devices, data servers, virtual machine instances, and data storage devices.

8. The computer-implemented method of claim 1, further comprising:
    determining a latency impact of joining the sub-indexes into a smaller number of sub-indexes or a single index;
    determining that the latency criterion would still be satisfied as a result of the joining; and
    causing the sub-indexes to be joined into a smaller number of sub-indexes or a single index.

9. The computer-implemented method of claim 1, further comprising:
    determining an amount of time since a previous adjustment of a number of indexes and sub-indexes for processing the data; and
    verifying that the amount of time at least meets a minimum time requirement before splitting the index into the number of sub-indexes.

10. The computer-implemented method of claim 1, further comprising:

modifying the allocation of resources by changing at least one of a capacity of resources allocated or a number of resources allocated.

11. The computer-implemented method of claim 1, wherein the resources are configured to execute a subsequent search query against the sub-indexes in parallel, the number of sub-indexes at most matching a number of resources for executing the queries against those sub-indexes.

12. The computer-implemented method of claim 1, further comprising:
receiving a subsequent search query;
causing the subsequent search query to be executed against each sub-index of the one or more sub-indexes;
receiving search results for each of the sub-indexes;
aggregating the search results into a single result set; and
providing a subset of the single result set as results for the search query.

13. A computer system, comprising:
at least one processor; and
memory including instructions that, when executed by the at least one processor, cause the computer system to:
determine a latency value, based on at least one of an average latency or a maximum latency, for processing of search queries against an index of stored data using an allocation of resources;
determine that the latency does not satisfy a latency criterion for the processing;
determine a latency impact of modifying a number of sub-indexes split from the index;
modify the number of sub-indexes based at least in part upon the latency impact and an amount of latency reduction needed to cause the latency value to satisfy the latency criterion; and
processing the search queries against the modified number of sub-indexes.

14. The computer system of claim 13, wherein the instructions when executed further cause the computer system to:
determine an additional latency impact of modifying the allocation of resources for processing search queries against the stored data; and
modify the allocation of resources based at least in part upon the additional latency impact and the amount of latency reduction needed to cause the latency value to satisfy the latency criterion.

15. The computer system of claim 14, wherein the instructions when executed further cause the computer system to:
determine an amount by which to split the index and a way in which to modify the allocation based at least in part upon a resulting cost to an entity associated with the stored data.

16. The computer system of claim 15, wherein the instructions when executed further cause the computer system to:
determining an amount of time since a previous adjustment of a number of indexes and sub-indexes for processing the data; and
verifying that the amount of time at least meets a minimum time requirement before splitting the index into a number of sub-indexes.

17. A computer-implemented method, comprising:
receiving, to an interface of a resource provider environment, a plurality of search queries associated with a customer having customer data stored in the resource provider environment, the customer further having an allocation of resources for processing search queries against the data;
determining a latency value, based on at least one of an average latency or a maximum latency, for processing of the plurality of search queries using the allocation of resources;
determining that the latency value does not satisfy a latency criterion for the customer;
determining a first latency effect of modifying the allocation of resources for processing search queries against the data;
determining a second latency effect of modifying a number of indexes and sub-indexes of the customer data against which the search queries are executed;
modifying at least one of the allocation of resources or the number of indexes and sub-indexes based at least in part upon the (1) first latency effect and the second latency effect and (2) an amount by which the latency does not satisfy a latency criterion for the customer, in order to cause the latency value to satisfy the latency criterion; and
evaluating the plurality of search queries against the data using at least one of the modified allocation of resources or the modified number of indexes and sub-indexes.

18. The computer-implemented method of claim 17, further comprising:
modifying the number of indexes and sub-indexes by at least one of splitting the number of indexes and sub-indexes into a larger number of sub-instances or joining sub-indexes into a smaller number of indexes and sub-indexes.

19. The computer-implemented method of claim 17, further comprising:
modifying the allocation of resources by changing at least one of a capacity of resources allocated or a number of resources allocated.

20. The computer-implemented method of claim 17, further comprising:
modifying at least one of the allocation of resources or the number of indexes and sub-indexes further based at least in part upon a resulting cost to the customer, wherein a rule for the modifying includes minimizing the resulting cost while satisfying the latency criterion for the customer.

* * * * *